Figure 1:
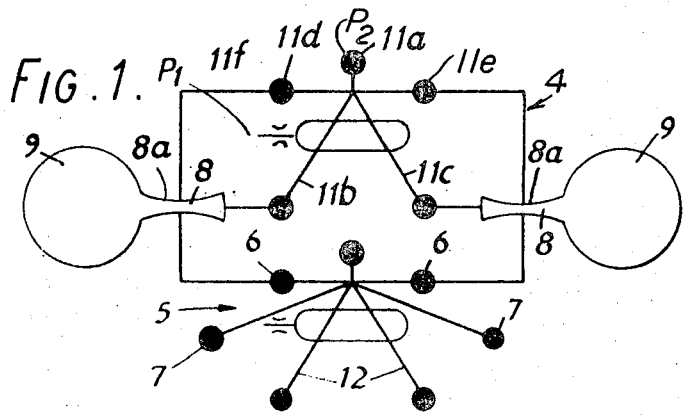

United States Patent [19]

Davies et al.

[11] 3,722,521

[45] Mar. 27, 1973

[54] FLUIDIC APPARATUS, MORE PARTICULARLY FOR THE DETERMINATION OF PRESSURE RATIOS

[75] Inventors: Guy Edward Davies, Fareham; Christopher Guy Scott Wilson, Cowplain, both of England

[73] Assignee: Plessey Handel und Investments A.G., Zug, Switzerland

[22] Filed: June 1, 1971

[21] Appl. No.: 148,774

[30] Foreign Application Priority Data

June 2, 1970 Great Britain.....................26,589/70

[52] U.S. Cl..................................................137/81.5
[51] Int. Cl..............................................F15c 1/12
[58] Field of Search......................................137/81.5

[56] References Cited

UNITED STATES PATENTS

| 3,228,410 | 1/1966 | Warren et al | 137/81.5 |
|---|---|---|---|
| 3,159,168 | 12/1964 | Reader | 137/81.5 |
| 3,185,166 | 5/1965 | Horton et al. | 137/81.5 |
| 3,217,727 | 11/1965 | Spyropoulos | 137/81.5 |
| 3,261,372 | 7/1966 | Burton | 137/81.5 |
| 3,285,264 | 11/1966 | Boothe | 137/81.5 |
| 3,458,129 | 7/1969 | Woodson | 137/81.5 X |
| 3,474,805 | 10/1969 | Swartz | 137/81.5 X |
| 3,504,691 | 4/1970 | Campagnuolo et al | 137/81.5 |
| 3,557,814 | 1/1971 | Neradka | 137/81.5 |

*Primary Examiner*—Samuel Scott
*Attorney*—Blum, Moscovitz, Friedman & Kaplan

[57] ABSTRACT

In order to produce a sequence of square-wave pressure pulses of a duty cycle ratio corresponding to the ratio of two input pressures, the lower one of the two input pressures and the pressure at the tapping of a Venturi, the outlet of which is also connected to the lower pressure, and to the inlet of which the higher one of the two pressures is applied via a fixed orifice, are applied to one pair of inputs of a double-input bistable fluidic switch whose other pair of inputs are connected to the output of a fluidic oscillator producing a triangle-waveform output and operated by the higher one of the input pressures.

8 Claims, 12 Drawing Figures

PATENTED MAR 27 1973 3,722,521

SHEET 1 OF 3

3,722,521

FLUIDIC APPARATUS, MORE PARTICULARLY FOR THE DETERMINATION OF PRESSURE RATIOS

This invention relates to fluidic apparatus and has for its object to provide improved fluidic devices which can be employed in the production, by pure-fluidic means, of a square-wave output waveform whose pulse-width ratio is modulated in accordance with the ratio of two input pressures. With this object in view, the invention provides a pure-fluidic square-wave generator, as well as means for modulating the pulse-width ratio of the output waveform of this generator and a fluidic device for producing a pulse-width control pressure signal for these modulating means that passes through zero at a predetermined or selected value of the ratio of a first input pressure to a second lower input pressure, and an arrangement in which the output signal of the latter fluidic device is applied to the pulse-width modulation input of the square-wave generator. Thus one aspect of the invention consists in a fluidic square-wave generator which comprises a fluidic oscillator producing a periodically varying output pressure of substantially triangular waveform, and a fluidic two-position switch having a control input to which said output pressure is supplied by the oscillator at such a level as to cause the switch to change once in each output-pressure cycle of the oscillator to each of its two positions.

Preferably the switch in this generator is a bistable fluidic switch of the wall-adhesion or Coanda type. In order to permit ready modulation of the pulse-width ratio, the switch preferably is a double-input bistable fluidic switch having a first input pair which is connected to the oscillator output and a second input pair which serves for the application of a pulse-width control pressure signal. A more specific aspect of the invention provides a fluidic device for producing a square wave output signal that is pulse-width modulated in accordance with the variation of a pressure ratio from a predetermined or preset value. To achieve this the square-wave generator includes a fluidic device for producing a pulse-width control pressure signal that passes through zero at a predetermined or selected value of the ratio of a first input pressure to a second, lower input pressure, said device comprising structure formed with a flow passage connectable at one end to a point at the first and at its other end to a point at the second of said input pressures, said flow passage including, in series with each other, a restrictor orifice and a venturi, said venturi having a throat between an inlet facing said one end and an outlet facing said other end of the passage, with said restrictor orifice interposed between said one end of the passage and said inlet, the structure also containing a tapping communicating with the flow passage approximately at the throat of the venturi for supplying, in conjunction with said second input pressure, the pulse-width control signal applied to the second-input pair of the double-input fluidic switch.

Preferably the orifice of this device is exchangeable or adjustable so as to permit the area of the orifice, and thus the pressure ratio at which the pulse-width control signal passes through zero, to be selected.

Figure 2A:
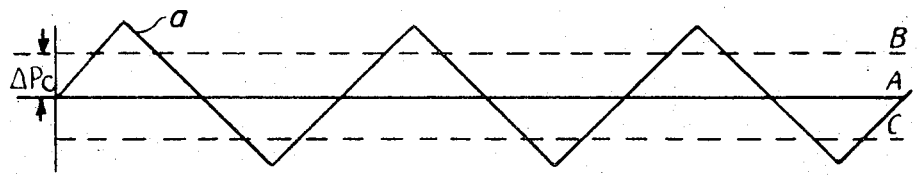
Figure 2B:
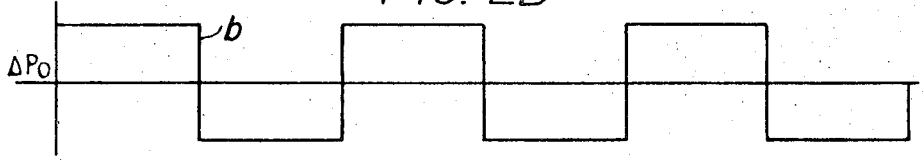
Figure 2C:
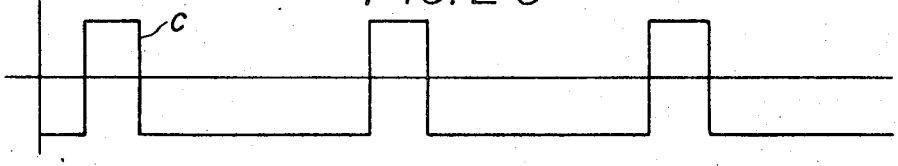
Figure 2D:
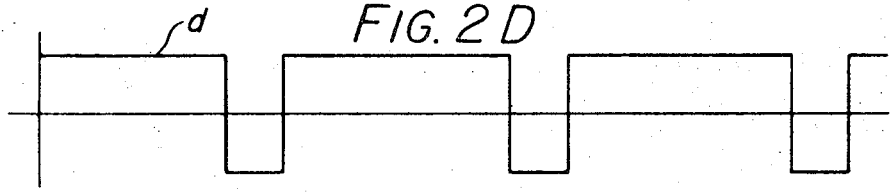
Figure 3:
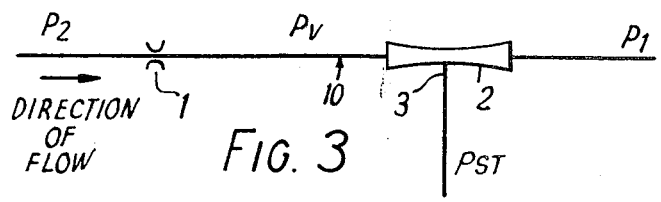
Figure 4:
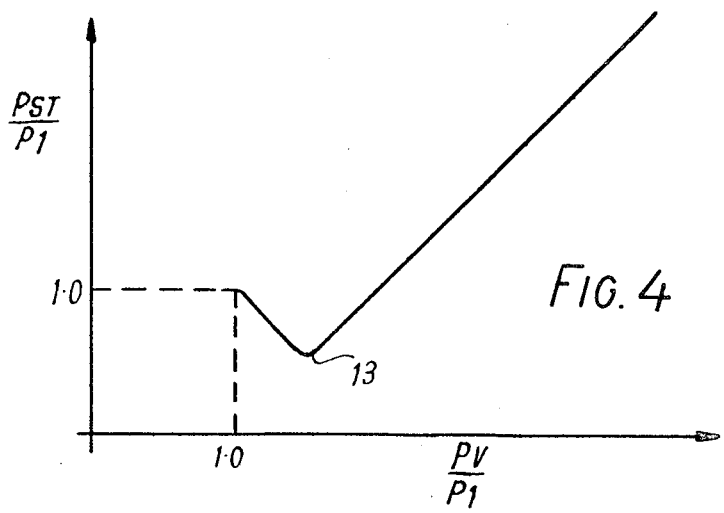
Figure 5:
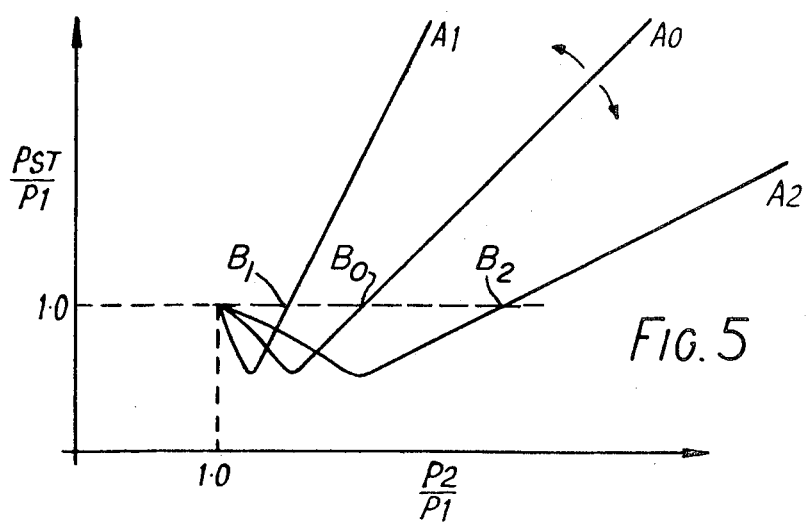
Figure 6:
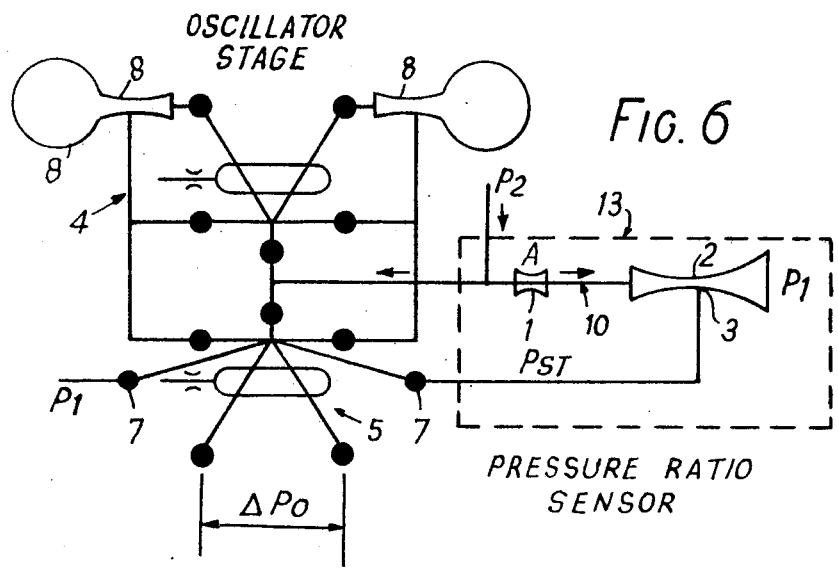
Figure 7A:
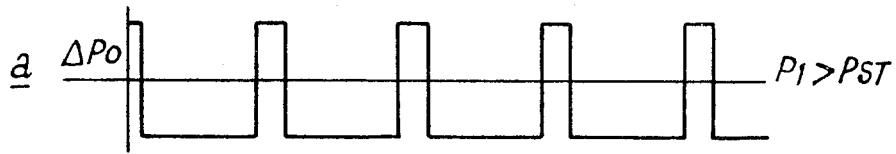
Figure 7B:
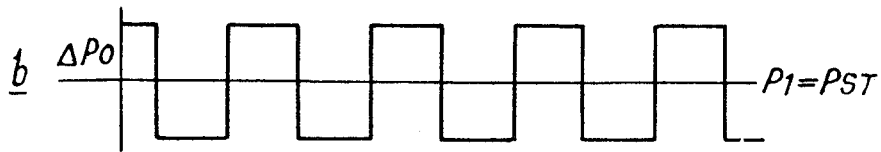
Figure 7C:
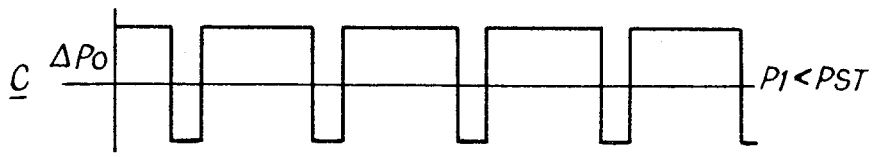

In order that the invention may be more readily understood, its various aspects will now be described in more detail, with reference to the accompanying drawings, in which FIG. 1 is a diagram of a fluidic square-wave generator according to the invention which is equipped with means for modulating the pulse-width ratio of the square wave;

FIGS. 2A, 2B, 2C and 2D respectively show, on a common time base, four waveforms $a$, $b$, $c$, and $d$ derived from this generator, $a$ being the oscillator output waveform, $b$ being the square-waveform output of the generator obtained in the absence of a pressure difference between the two secondary inputs in the modulator stage, and $c$ and $d$ being the waveforms respectively obtained when the pressure-input bias thus applied is varied from the zero line A of FIG. 2A to the positive bias value B and to the negative bias value C, FIG. 3 diagrammatically illustrates a fluidic device for producing a pulse-width-control pressure signal which so varies with the ratio between a first input pressure and a second, lower input pressure as to pass through zero when this ratio has a predetermined or selected value FIG. 4 is a diagram showing the ratio of venturi-throat pressure to venturi-outlet pressure as a function of the ratio between venturi-inlet pressure and venturi-outlet pressure, FIG. 5 similarly shows, for three different values $A_0$, $A_1$ and $A_2$ of the restrictor-orifice area in FIG. 3, the ratio of the venturi-throat pressure to the venturi outlet pressure as a function of the ratio of the system-input pressure to the venturi-outlet pressure, FIG. 6 shows the devices of FIGS. 1 and 3 combined to form a device generating a square-wave pressure-output waveform which is pulse-width modulated according to the ratio of a first input pressure to a second, lower input pressure, and FIGS. 7A, 7B, and 7C respectively show three output waveforms of this combined square-wave generator device, $a$ representing a negative departure, $b$ zero departure, and $c$ a positive departure from a predetermined pressure ratio.

Referring now first to FIG. 1, the illustrated pulse width-modulated square-wave generator is composed of an oscillator stage 4 and a double-input bistable switch constituting a modulator stage 5, to which the output of the oscillator stage 4 is applied. The oscillator stage 4 is constituted by an oscillator of the kind described in our co-pending U.S. Pat. application Ser. No. 142165, filed May 11, 1971. It includes a bistable fluidic switch 11 of the Coanda type, which has a power-jet input 11a shown connected to the system-input pressure $P_2$, two output branches 11b and 11c, a pair of control inlets 11d and 11e, and a vent outlet 11f which is shown to lead through a restrictor to a second, lower input pressure $P_1$. Each of the outlet branches 11b and 11c leads via a Venturi nozzle 8, hereinafter called a venturi, to a capacity chamber 9, and the tapping 8a of each venturi 8 is connected to an associated one of the control inlets 11d and 11e of the bistable switch 11 so that a pressure increase at the tapping will tend to deflect the power jet from the output branch 11b or 11c to which the venturi in question is connected and transfer it to the other output branch. The pressures at the tappings of the two venturis 8 are also respectively applied to a first pair 6 of control inputs of the double-input bistable switch constituting the modulator stage 5.

In operation of the oscillator, fluid from the power jet input 11a will flow through one of the output branches 11b, 11c and its associated Venturi 8 to the associated capacity chamber 9, building up in the latter a progressively increasing pressure. The pressure at the venturi tapping will at the beginning, when the pressure in the capacity chamber 9 is still approximately at the level of the lower input pressure $P_1$, be lower than the latter pressure due to the effect of the venturi diffusor at the high rate of flow, prevailing under these conditions, towards the capacity chamber from its associated output branch and the effect of this reduced pressure at the venturi throat, which is applied to the appropriate control input 11d of the bistable switch 11, tends to assist the effect of the wall adhesion which itself tends to keep the power jet flowing to the same output branch of the bistable switch. As pressure in the capacity chamber 9 builds up, the pressure at the venturi tapping will rise due both to the increase of the pressure in the chamber 9 and to the reduction in the rate of flow through a Venturi towards the capacity chamber 9 as the difference between the pressure $P_2$ and the pressure in that chamber 9 decreases. When as a result the pressure at the corresponding control inlet 11d or 11e reaches a sufficient value, it will switch the power jet from the output branch which has been supplying the said capacity chamber 9 to the other output branch, which then supplies fluid to the other capacity chamber 9. The described sequence of events is now repeated in respect of the other output branch and the other capacity chamber of the oscillator, and fluid from the previously charged capacity chamber 9 will now blow off through its associated venturi 8 and the associated outlet branch of the switch 11 to the vent 11f. Although this flow from the previously charged chamber tends to reduce pressure at the venturi throat of the latter, this pressure reduction will not be able to deflect the power jet back to the original output branch, since the action of this pressure reduction is opposed by the pressure reduction at the throat 8a of the other venturi which conducts the charging flow of fluid to the other capacity chamber. Moreover, in order to ensure that the suction effect of the latter venturi prevails, the vent 11f of the switch 11 is preferably, as illustrated, provided with a restricted orifice to reduce the rate of discharge from the first-mentioned capacity chamber and thus to ensure that the pressure at the tapping of the venturi associated with the capacity chamber that is being discharged is always higher than the pressure at the tapping of the venturi whose capacity chamber is being charged.

During each period of flow through one of the outlet branches 11b or 11c, the pressure rise in the associated capacity chamber will progressively decline, but the effect of this decline upon the pressure at the throat 8a of the venturi 8 interposed between said branch and reservoir will be counteracted by the decrease in the pressure reduction at the venturi throat so that, if the oscillator output is obtained as the difference between the pressures at the throats 8a of the two venturis 8, the, operation of the described oscillator will result in the production, as a signal output, of a pressure difference $\Delta P_c$ between the two venturi tappings which varies periodically as an approximately triangular zig-zag waveform which alternates symmetrically between a positive and a negative maximum as shown in FIG. 2A. As already mentioned, this signal is applied to one set of control input ports 6,6 of the double-input bistable switch 5, while a suitably chosen pressure difference is applied for biasing purposes to the second set of control input ports 7, which will therefore hereinafter be referred-to as bias-input ports. The operation of modulator-stage switch 5 essentially consists in switching-over its output flow from one to the other of the two output branches 12 of the switch 5, thus reversing the direction of its output-pressure difference $\Delta P_0$, when the combined effect of the pressure-difference waveform applied across the said one set of control-input ports 6 and bias-pressure difference applied to the other pair of control input ports 7 passes through zero. Thus, when no bias pressure difference is applied to the bias-input ports 7, the switch-over operation takes place each time the zig-zag waveform $a$ of FIG. 2A crosses the zero pressure-difference line indicated at A in FIG. 2A. The output $\Delta P_0$ across the two output branches 12 of the modulator-stage bistable switch 5 will therefore be a square waveform having a duty cycle ratio 1:2, as shown in FIG. 2B.

When a positive bias-pressure difference is applied across the bias-input ports 7 of the double-input bistable switch 5, as indicated by the bias level B in of FIG. 2A, switching-over will take place each time the zig-zag waveform a crosses the line representing the bias level B, and the output of the double-input bistable switch 5 will therefore correspond to the waveform c illustrated in FIG. 2C, in which the positive-going mark pulses are considerably reduced in length with a corresponding increase in the length of the intervening negative-going pulses.

When a negative bias-pressure difference is instead applied, as indicated by the bias level C in FIG. 2A, switching-over will take place at the intersection of the zig-zag waveform $a$ with this negative bias level C. The result of this is the output waveform $d$ shown in FIG. 2D, in which the positive-going mark-period pulses are appreciably longer than those in the symmetrical waveform of FIG. 2B at the expense of the intervening negative-going pulses. It will now be readily appreciated that the variation of the duty-cycle ratio in either direction will be controlled by the magnitude of the bias pressure difference applied, up to a limit which is normally constituted by the saturation level of the double-input bistable switch and provided that the bias level remains within the amplitude limits of the zig-zag waveform output of the oscillator 4.

Owing to the fact that the output waveform a of the oscillator unit 4 is, as shown, a zig-zag line whose gradient is constant throughout the length of the upgoing and down-going portions respectively, it will be readily appreciated that if T represents the length of a complete cycle of the output waveform of the modulator-stage bistable switch 5, and $t$ represents the length of the positive-going pulses, the duty cycle ratio $t/T$ of that output waveform is a direct measure of the bias-pressure difference applied across the bias-input ports 7 of the modulator-stage bistable switch 5. Thus if a uniform bias-pressure difference $\Delta P$ is applied across these ports 7, a proportional representation of this applied bias will be produced in the output $\Delta P_0$ across the two output branches 12 of the modulator-stage bistable switch 5 as a variation from an "equal," i.e., 1:2 duty cycle ratio, and it will be readily appreciated that, while this duty-cycle ratio may be ascertained by measuring the length of each positive-going pulse and dividing it by the length of a complete pulse cycle, the computation of the duty-cycle ratio will in practice generally be performed automatically, for example by a fluidic device or an electronic device, in order to permit the value of the pressure difference applied across the bias input ports 7 to be obtainable by direct reading-out.

While the apparatus described with reference to FIG. 1 is capable of a wide variety of applications in fluidic apparatus, for example in a fluidic pressure multiplier, it has been developed with a particular view to its use in a fluidic device for generating a square-wave pressure-output waveform which is pulse-width modulated according to the ratio of a first input pressure to a second, lower input pressure, and one form of a fluidic device suitable for constituting a source for the bias-pressure difference $\Delta P_C$ to be applied to the bias-input ports 7 of the modulator-stage bistable fluidic switch 5, and which produces a pressure difference which itself varies according to the ratio of a first input pressure to a second, lower input pressure, will now be described with reference to FIG. 3 of the accompanying drawings.

This device comprises a line or passage 10 which connects a point at the first, higher input pressure $P_2$ with a point at the second, lower input pressure $P_1$. This passage includes, on its way from the first to the second of these points, an orifice 1, while downstream of the latter, and in series with it, it includes a Venturi nozzle 2. The Venturi nozzle, hereinafter called a venturi, is provided with a static-pressure tapping 3 at a point along the length of the nozzle which is selected in the vicinity of the nozzle throat,, for example in dependence upon the pressure-ratio range to be sensed. The pressure at the venturi inlet, that is to say between the orifice 1 and the venturi 2, will be called $P_V$, and the pressure at the venturi tapping will be called $P_{ST}$. FIG. 4 is a diagram showing the ratio of the tapping pressure $P_{ST}$ to venturi-outlet pressure $P_1$ as a function of the pressure ratio $P_V/P_1$ across the venturi, and it will be seen that this line starts at a unity pressure ratio across the venturi, at a point representing the condition in which there is no flow, and in which accordingly all three pressures $P_V$, $P_{ST}$ and $P_1$ are equal, and has a downward gradient up to a point 13, at which the gradient becomes reversed so that while with increasing $P_V P_1$ up to this point the tapping pressure ratio $P_{ST}/P_1$ decreased, it now begins to increase with increasing pressure ratio $P_V/P_1$ across the venturi. As will be readily seen by those skilled in the art, this reversal is due to the creation of so-called choking conditions in the venturi throat when the pressure ratio $P_V/P_{ST}$ between venturi inlet and venturi throat reaches a critical value. It will also be seen from FIG. 4 that, due to this reversal of gradient, the line representing $P_{ST}/P_1$ will pass through unity once more at a value of $P_V/P_1$ which is greater than 1.

In FIG. 5, $P_{ST}/P_1$ has been plotted as a function of the overall pressure ratio $P_2/P_1$, wherein $P_2 - P_1$ exceeds $P_V$ by the pressure drop in the orifice, and it will be readily observed that that point of intersection of the $P_{ST}/P_1$ line with the unity-value line can be selectively varied by the choice of a suitable area of the orifice 1. In FIG. 5 the line $A_0$ corresponds to one predetermined area of the orifice, line $A_1$ corresponds to an orifice of a predetermined increased area, and line $A_2$ corresponding to an orifice of a predetermined decreased area.

If the said point of intersection of the $P_{ST}/P_1$ line with the line corresponding to unity value of $P_{ST}/P_1$ is chosen as the operating point of the device, it becomes thus possible to establish, by the choice of a suitable orifice area an operating point for the device at which the output pressure or pressure ratio becomes positive when the ratio of the input pressures exceeds, and negative when the ratio of the input pressures is less than selected value, and according to a preferred feature of the invention advantage is taken of this facility when the output-pressure difference is intended to be applied to the bias-input ports 7 of the modulator-stage bistable switch 5 of FIG. 1 in the manner described hereinabove with reference to FIGS. 2A to 2D.

FIG. 6 illustrates a square-wave generator system in which the pressure-ratio responsive device described with reference to FIG. 3 has been combined with the square-wave generator described with reference to FIG. 1 so as to supply the bias pressure difference across the bias-input ports 7 of the modulator stage 5 of that generator. This square-wave generator constitutes a fluidic device which is capable of producing a time modulated signal that is a direct function of the ratio of two input pressures. It is preferably constructed as an integrated fluidic system, that is to say a fluidic system formed in one integral block of material, although for certain purposes it may be preferred to use two integrated systems, respectively corresponding to the devices of FIGS. 1 and 3, and to connect these in the manner of building blocks, for example of modular form. In FIG. 6 the same references have been used as in FIGS. 1 and 3 to indicate corresponding parts, and the only additional reference number 13 has been used for describing the device shown in FIG. 3 taken as a whole.

As will be readily seen in FIG. 6, the venturi-outlet pressure $P_1$ and the venturi-tapping pressure $P_{ST}$ are respectively applied to the bias-input ports 7 of the modulator-stage bistable switch 5. It will be readily appreciated that with this arrangement the two pressures respectively applied to the two bias-input ports 7 are $P_{ST}$ and $P_1$ so that the bias-pressure difference $\Delta P_C$ equals $P_{ST} - P_1$ and its ratio $\Delta P_C/P_1$ to the second, lower input pressure $P_1$ becomes $(P_{ST}/P_{P1}) - 1$, or in other words, the bias-pressure difference $\Delta P_C$ becomes zero and then reverses its direction when the venturi-tapping pressure ratio $P_{ST}/P_1$ passes through unity at points $B_0$, $B_1$ and $B_2$ respectively of the lines $A_0$, $A_1$ and $A_2$ in FIG. 5, and the output waveforms a, b, and c corresponding to these cases are respectively illustrated in FIGS. 7A, 7B, and 7C. This utilization of a bias range symmetrical to zero bias makes it possible to obtain maximum variation of the duty cycle ratio of the square-waveform output of the device by lengthening of the positive-going pulses when the overall pressure ratio $P_2/P_1$ increases from that of the operating point and shortening the positive-going pulses from equality with the negative-going pulses in the case of departure in the opposite direction from the $P_2/P_1$ value at the operating point.

Various feature of the embodiments described with reference to the accompanying drawings may be modified without departing from the scope of the invention. Thus for example, by modifying some details of the arrangement, which will be obvious to those skilled in the art, an increased duty-cycle ratio may be arranged to be indicative of a decrease in the overall pressure ratio and vice versa if this is preferred. In either case it is desirable to design the system in such a manner that it will operate as nearly as possible from full negative modulation to full positive modulation of the pulse-width ratio over the operational range of the pressure-ratio sensor. As mentioned in connection with FIG. 4, the conversion of the time-modulated pulse output into a true measure of pressure ratio may be effected automatically if desired, and the use of an electronic interface for this purpose is believed at the moment to be convenient, but a fluidic system or a mechanical interface could be adopted, if preferred, in a manner which will be readily apparent to those skilled in the art.

What we claim is:

1. A pulse-width modulated fluidic square-wave generator, which comprises a pure fluidic oscillator constructed to produce an output of approximately triangular waveform which alternates between a positive and a negative maximum, and a double-input bistable fluidic switch, said switch having a first input pair connected to the oscillator to receive said output, and having a second input pair connected to means for applying to said second input pair a pulse-width control pressure signal.

2. A fluidic square-wave generator as claimed in claim 1, wherein the oscillator comprises a bistable fluidic switch having a power input, two output branches each connected to a capacity chamber via a Venturi having a tapping, and a pair of control inputs, the throat of said Venturis constituting the oscillator outputs and being respectively connected to said control inputs of the oscillator to provide a positive feedback.

3. A fluidic square-wave generator as claimed in claim 1, wherein said oscillator includes a bistable fluidic switch having a power input and two output branches and having a pair of control inputs for switching the flow of fluid from said power input from one to the other and vice versa of said output branches, a pair of capacity chambers, a pair of Venturis arranged to each connect one of said output branches to one of said capacity chambers, each said Venturi having a throat tapping, the throat tappings of the two Venturis being connected to said first input pair of the double-input fluidic switch.

4. A square-wave generator as claimed in claim 1, which includes a fluidic device for producing a pulse-width control-pressure signal that passes through zero at a predetermined or selected value of the ratio of a first input pressure to a second, lower input pressure, said device comprising structure formed with a flow passage connectable at one end to a point at the first and at its other end to a point at the second of said input pressures, said flow passage including, in series with each other, a restrictor orifice and a venturi, said venturi having a throat between an inlet facing said one end and an outlet facing said other end of the passage, with said restrictor orifice interposed between said one end of the passage and said inlet, the structure also containing a tapping communicating with the flow passage approximately at the throat of the venturi for supplying, in conjunction with said second input pressure, the pulse-width control signal applied to the second input part of the double-input fluidic switch.

5. A fluidic device as claimed in claim 4, which includes means for selectively varying the area of said restrictor orifice.

6. A device as claimed in claim 4 wherein the double-input bistable fluidic switch is provided with a vent, and which includes means for connecting both this vent and the second input of said second input pair of the said double-input switch to a point at said second pressure.

7. A device as claimed in claim 6, wherein the double-input switch has a power input point that is connected to the line leading from a point at said first pressure to said restrictor orifice.

8. A device as claimed in claim 7, wherein the oscillator of the square-wave generator comprises a bistable fluidic switch having a power input, two output branches each connected to a capacity chamber via a venturi having a tapping, a pair of control inputs and a vent, the throats of said venturis constituting the oscillator outputs and being respectively connected to said control inputs of the oscillator to provide a positive feedback, said power input of the oscillator being connected to the power input of the double-input switch, and the vent of said oscillator being connected to the point at said second pressure.

* * * * *